US008129454B2

(12) United States Patent
Fortuyn et al.

(10) Patent No.: US 8,129,454 B2
(45) Date of Patent: Mar. 6, 2012

(54) PROFILE EXTRUSION METHOD WITH REDUCED DIE BUILD-UP AND EXTRUDED ARTICLE PREPARED THEREBY

(75) Inventors: Johannes E. Fortuyn, Bergen op Zoom (NL); Torben Paul Kempers, Bergen op Zoom (NL); Vijay R. Mhetar, Westfield, IN (US); Kirti Sharma, Bergen op Zoom (NL)

(73) Assignee: Sabic Innovative Plastics IP B.V. (NL)

( * ) Notice: Subject to any disclaimer, the term of this patent is extended or adjusted under 35 U.S.C. 154(b) by 377 days.

(21) Appl. No.: 12/277,859

(22) Filed: Nov. 25, 2008

(65) Prior Publication Data

US 2009/0326113 A1 Dec. 31, 2009

Related U.S. Application Data

(60) Provisional application No. 61/075,829, filed on Jun. 26, 2008.

(51) Int. Cl.
*C08G 18/77* (2006.01)
(52) U.S. Cl. .... 524/115; 524/480; 524/148; 264/211.12
(58) Field of Classification Search .................. 524/115
See application file for complete search history.

(56) References Cited

U.S. PATENT DOCUMENTS

| 4,863,998 | A | * | 9/1989 | Yeager ........................... 525/132 |
| 5,089,200 | A | * | 2/1992 | Chapman et al. ............. 264/127 |
| 5,468,530 | A | | 11/1995 | Gotz et al. |
| 5,629,062 | A | | 5/1997 | Ejiri et al. |
| 6,306,953 | B1 | * | 10/2001 | Fortuyn et al. ................ 524/508 |
| 6,357,802 | B1 | | 3/2002 | Nozato et al. |
| 6,706,350 | B2 | | 3/2004 | Sato et al. |
| 6,762,218 | B2 | | 7/2004 | Geprags et al. |
| 6,875,387 | B2 | | 4/2005 | Mhetar et al. |
| 2004/0102551 | A1 | * | 5/2004 | Sato et al. ..................... 524/115 |
| 2006/0079642 | A1 | | 4/2006 | Adedeji et al. |
| 2006/0111549 | A1 | | 5/2006 | Elkovitch et al. |
| 2006/0231809 | A1 | | 10/2006 | Fishburn et al. |
| 2007/0080483 | A1 | | 4/2007 | Uosaki et al. |
| 2007/0082998 | A1 | | 4/2007 | Uosaki et al. |
| 2007/0083035 | A1 | * | 4/2007 | Riding et al. ................. 528/480 |
| 2007/0100055 | A1 | | 5/2007 | Uosaki et al. |
| 2007/0100056 | A1 | * | 5/2007 | Uosaki et al. ................ 524/487 |
| 2007/0225423 | A1 | | 9/2007 | Uosaki et al. |
| 2007/0261878 | A1 | | 11/2007 | Kosaka et al. |
| 2008/0064085 | A1 | | 3/2008 | McArdle |

OTHER PUBLICATIONS

Hawley's Condensed Chemical Dictionary, 12 edition, Lewis, Richard, 1993, p. 733.*
Dynamar Polymer Processing Additives FX 9613, Aug. 2001.*
Written Opinion and International Search Report; International Application No. PCT/US2009/045570; International Filing Date May 29, 2009; 9 pages.

(Continued)

*Primary Examiner* — Doris Lee
(74) *Attorney, Agent, or Firm* — Cantor Colburn LLP

(57) ABSTRACT

A profile extrusion method utilizes a specific poly(arylene ether)/polystyrene composition with little or no unhydrogenated poly(conjugated diene) rubber. The method substantially reduces the amount of die lip build-up during continuous profile extrusion for eight hours or more. Reduction of die lip build-up in turn improves the structural integrity and aesthetic properties of the extruded article.

15 Claims, 1 Drawing Sheet

OTHER PUBLICATIONS

ASTM D 648, Standard Test Method for Deflection Temperature of Plastics Under Flexural Load in the Edgewise Position.
ISO 178, Plastics—Determination of flexural properties.
ISO 179, Plastics—Determination of Charpy impact properties.
ISO 180, Plastics—Determination of Izod impact strength.
ISO 306, Plastics—Thermoplastic materials—Determination of Vicat softening temperature (VST).
ISO 1133, Plastics—Determination of the melt mass-flow rate (MFR) and the melt volume—flow rate (MVR) of thermoplastics.
ISO 11443, Plastics—Determination of the fluidity of plastics using capillary and slit-die rheometers.
International Preliminary Report on Patentability and Written Opinion of the International Searching Authority; International Application No. PCT/US2009/045570; International Filing Date May 29, 2009; 6 pages.

* cited by examiner

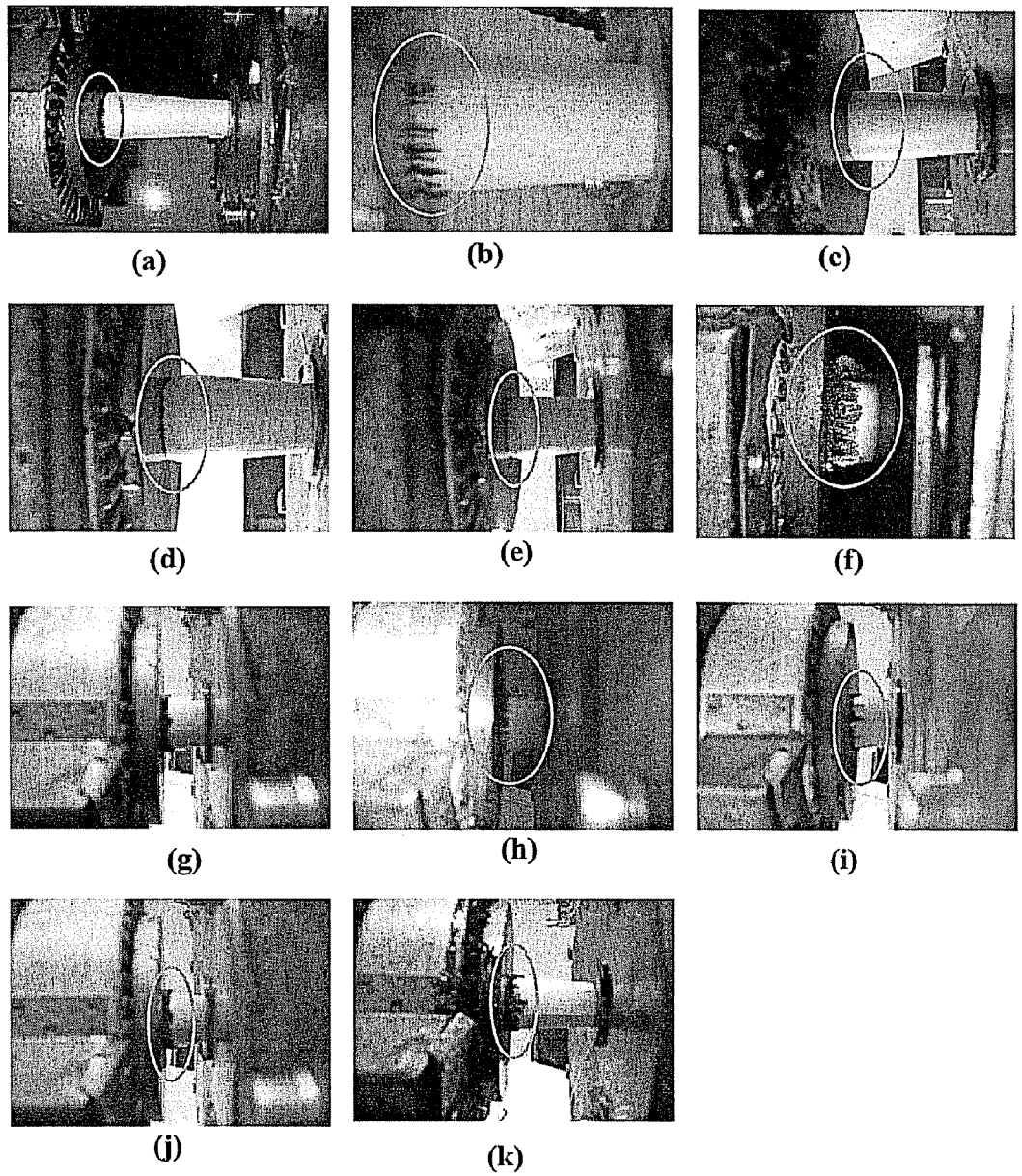

PROFILE EXTRUSION METHOD WITH REDUCED DIE BUILD-UP AND EXTRUDED ARTICLE PREPARED THEREBY

CROSS REFERENCE TO RELATED APPLICATION

This application claims the benefits of U.S. Provisional Patent Application Ser. No. 61/075,829 filed Jun. 26, 2008, which is fully incorporated herein by reference.

BACKGROUND OF THE INVENTION

For many years, poly(vinyl chloride) was the preferred material for fabricating pipe used as a conduit for electrical wire and cable. However, many countries have recently prohibited the use of halogenated materials such as poly(vinyl chloride) in building materials. Low- or no-halogen candidate materials for replacing poly(vinyl chloride) in electrical conduit include polypropylene, polycarbonate-poly(acrylonitrile-butadiene-styrene) blends, polyamides, and poly(arylene ether)-polystyrene blends. Among these materials, poly(arylene ether)-polystyrene blends are desirable for heat resistance that is superior to polypropylene, and density that is lower than polycarbonate-poly(acrylonitrile-butadiene-styrene) blends. Poly(arylene ether)-polystyrene blends can also meet relevant requirements for noncorrosivity, low toxicity of fumes during combustion, low smoke density generated during combustion, high dielectric strength, and low moisture absorption. As a result, poly(arylene ether)-polystyrene blends have been reported as replacements for poly(vinyl chloride) in the fabrication of electric conduit. However, it has recently been observed that continuous profile extrusion of poly(arylene ether)-polystyrene blends over many hours sometimes can result in the generation of extruder die lip build-up that can adversely affect the structural and aesthetic properties of the final pipe. There is therefore a desire for a method of profile extruding a poly(arylene ether)-polystyrene composition that reduces or eliminates the die lip build-up problem while preserving the other desirable properties of extruded articles produced from poly(arylene ether)-polystyrene blends.

BRIEF DESCRIPTION OF THE INVENTION

The above-described and other drawbacks are alleviated by a method of reducing die lip build-up during profile extrusion of a thermoplastic article, comprising: extruding through a die a thermoplastic composition having a temperature of 220 to 240° C.; and cooling the extruded composition to form an extruded thermoplastic article; wherein the thermoplastic composition comprises 56 to 62 weight percent of a poly(arylene ether), 16 to 22 weight percent of a homopolystyrene, 7 to 13 weight percent of a hydrogenated block copolymer of an alkenyl aromatic compound and a conjugated diene, and 7 to 13 weight percent of a triaryl phosphate; wherein the thermoplastic composition comprises less than 1 weight percent of unhydrogenated poly(conjugated diene) rubber; wherein all weight percents are based on the total weight of the thermoplastic composition; wherein the thermoplastic composition exhibits an Izod notched impact strength at −30° C. of at least 6 kilojoules/meter$^2$, as measured according to ISO 180 using notch configuration A, and a Vicat B value of at least 125° C., measured according to ISO 306, Method B120; wherein the extruding the thermoplastic composition produces an average die lip build-up per hour measured over the course of 8 continuous hours of extrusion of the thermoplastic composition, measured as described in the working examples; and wherein the average die lip build-up is less than that produced by a corresponding thermoplastic composition in which the hydrogenated block copolymer is replaced by an equal weight of an unhydrogenated block copolymer.

Another embodiment is a profile extruded article, produced by a process comprising: extruding through a die a thermoplastic composition having a temperature of 220 to 240° C.; and cooling the extruded composition to form an extruded thermoplastic article; wherein the thermoplastic composition comprises 56 to 62 weight percent of a poly(arylene ether), 16 to 22 weight percent of a homopolystyrene, 7 to 13 weight percent of a hydrogenated block copolymer of an alkenyl aromatic compound and a conjugated diene, and 7 to 13 weight percent of a triaryl phosphate; wherein the thermoplastic composition comprises less than 1 weight percent of unhydrogenated poly(conjugated diene) rubber; wherein all weight percents are based on the total weight of the thermoplastic composition; wherein the thermoplastic composition exhibits an Izod notched impact strength at −30° C. of at least 6 kilojoules/meter$^2$, as measured according to ISO 180 using notch configuration A, and a Vicat B value of at least 125° C., measured according to ISO 306, Method B120; wherein extrusion of the thermoplastic composition over the course of 8 continuous hours produces an average die lip build-up per hour less than or equal to 5 milligrams per hour, measured as described in the working examples.

These and other embodiments are described in detail below.

BRIEF DESCRIPTION OF THE DRAWINGS

FIG. 1 presents images of pipe extrusion dies for extrusions of the following working examples: (a) Comparative Example 9; (b) Comparative Example 10; (c) Example 5; (d) Example 6; (e) Example 7; (f) Comparative Example 8; (g) Comparative Example 11; (h) Comparative Example 14; (i) Comparative Example 15; (j) Comparative Example 16; (k) Comparative Example 17.

DETAILED DESCRIPTION OF THE INVENTION

After poly(arylene ether)-polystyrene blends began being used commercially in a profile extrusion process to fabricate electric conduit, die lip build-up was sometimes observed with continuous extrusion over a period of at least several hours. Through various tests, it was determined that die lip build-up was best reduced by substantially reducing or eliminating the content of unhydrogenated poly(conjugated diene) rubber in the extruded composition.

Thus, one embodiment is a method of reducing die lip build-up during profile extrusion of a thermoplastic article, comprising: extruding through a die a thermoplastic composition having a temperature of 220 to 240° C.; and cooling the extruded composition to form an extruded thermoplastic article; wherein the thermoplastic composition comprises 56 to 62 weight percent of a poly(arylene ether), 16 to 22 weight percent of a homopolystyrene, 7 to 13 weight percent of a hydrogenated block copolymer of an alkenyl aromatic compound and a conjugated diene, and 7 to 13 weight percent of a triaryl phosphate; wherein the thermoplastic composition comprises less than 1 weight percent of unhydrogenated poly(conjugated diene) rubber; wherein all weight percents are based on the total weight of the thermoplastic composition; wherein the thermoplastic composition exhibits an Izod notched impact strength at −30° C. of at least 6 kilojoules/ meter$^2$, as measured according to ISO 180 using notch configuration A, and a Vicat B value of at least 125° C., measured according to ISO 306, Method B120; wherein the extruding the thermoplastic composition produces an average die lip build-up per hour measured over the course of 8 continuous hours of extrusion of the thermoplastic composition, measured as described in the working examples; and wherein the average die lip build-up is less than that produced by a corresponding thermoplastic composition in which the hydrogenated block copolymer is replaced by an equal weight of an unhydrogenated block copolymer.

The method is generally applicable to profile extrusion and can be used to fabricate sheets, pipes, door frames, window frames, furniture trim, furniture frames, automotive trim, and the like. The method can utilize apparatus and methods of profile extruding poly(arylene ether) compositions, including those described in, for example, U.S. Pat. No. 5,468,530 to Gotz et al., U.S. Pat. No. 5,629,062 to Ejiri et al., and U.S. Pat. No. 6,357,802 to Nozato et al.

The method includes the step of extruding through a die a thermoplastic composition having a temperature of 220 to 240° C. Within this range, the thermoplastic composition temperature can be 225-235° C., specifically 230-235° C.

The method further includes the step of cooling the extruded composition to form an extruded thermoplastic article. Cooling methods include cooling in a flow of circulating gas, such as air, or cooling in a water bath.

The method utilizes a thermoplastic composition comprising specific amounts of a poly(arylene ether), a homopolystyrene, a hydrogenated block copolymer of an alkenyl aromatic compound and a conjugated diene, and a triaryl phosphate. The thermoplastic composition comprises less than 1 weight percent of unhydrogenated poly(conjugated diene) rubber, based on the total weight of the thermoplastic composition.

The thermoplastic composition comprises a poly(arylene ether). Suitable poly(arylene ether)s include those comprising repeating structural units having the formula

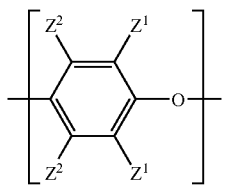

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue may also contain one or more carbonyl groups, amino groups, hydroxyl groups, or the like, or it may contain heteroatoms within the backbone of the hydrocarbyl residue. As one example, $Z^1$ may be a di-n-butylaminomethyl group formed by reaction of a terminal 3,5-dimethyl-1,4-phenyl group with the di-n-butylamine component of an oxidative polymerization catalyst.

In some embodiments, the poly(arylene ether) comprises 2,6-dimethyl-1,4-phenylene ether units, 2,3,6-trimethyl-1,4-phenylene ether units, or a combination thereof. In some embodiments, the poly(arylene ether) is a poly(2,6-dimethyl-1,4-phenylene ether).

The poly(arylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(arylene ether) can be in the form of a homopolymer, a copolymer, a graft copolymer, an ionomer, or a block copolymer, as well as combinations comprising at least one of the foregoing.

The poly(arylene ether) has an intrinsic viscosity of 0.3 to 0.55 deciliter per gram measured at 25° C. in chloroform. Specifically, the poly(arylene ether) intrinsic viscosity may be 0.35 to 0.5 deciliter per gram, more specifically 0.35 to 0.45 deciliter per gram.

The thermoplastic composition comprises 56 to 62 weight percent of the poly(arylene ether), based on the total weight of the thermoplastic composition. Within this range, the poly(arylene ether) amount can be 57 to 61 weight percent, more specifically 58 to 60 weight percent.

In addition to the poly(arylene ether), the thermoplastic composition comprises a homopolystyrene. As used herein, the term homopolystyrene refers to a homopolymer of styrene. Thus, the residue of any monomer other than styrene is excluded from the homopolystyrene. The homopolystyrene can be atactic, syndiotactic, or isotactic. In some embodiments, the homopolystyrene is atactic. In some embodiments, the homopolystyrene has a weight average molecular weight of about 100,000 to about 2,000,000 atomic mass units, specifically about 200,000 to about 1,000,000 atomic mass units.

The thermoplastic composition comprises 16 to 22 weight percent of the homopolystyrene, based on the total weight of the thermoplastic composition. With this range, the homopolystyrene amount can be 17 to 21 weight percent, specifically 18 to 20 weight percent.

In addition to the poly(arylene ether) and the homopolystyrene, the thermoplastic composition comprises a hydrogenated block copolymer of an alkenyl aromatic compound and a conjugated diene. For brevity, the component is sometimes referred to herein as the "hydrogenated block copolymer". The hydrogenated block copolymer can comprise about 15 to about 80 weight percent of poly(alkenyl aromatic) content and about 20 to about 85 weight percent of hydrogenated poly(conjugated diene) content. In some embodiments, the poly(alkenyl aromatic) content is about 20 to 40 weight percent. In other embodiments, the poly(alkenyl aromatic) content is greater than 40 weight percent to about 90 weight percent, specifically about 55 to about 80 weight percent.

In some embodiments, the hydrogenated block copolymer has a weight average molecular weight of about 3,000 to about 400,000 atomic mass units. The number average molecular weight and the weight average molecular weight can be determined by gel permeation chromatography and based on comparison to polystyrene standards. In some embodiments, the hydrogenated block copolymer has a weight average molecular weight of 40,000 to 400,000 atomic mass units, specifically 200,000 to 400,000 atomic mass units, more specifically 220,000 to 350,000 atomic mass units. In other embodiments, the hydrogenated block copolymer has a weight average molecular weight of 40,000 to less than 200,000 atomic mass units, specifically 40,000 to 180,000 atomic mass units, more specifically 40,000 to 150,000 atomic mass units.

The alkenyl aromatic monomer used to prepare the hydrogenated block copolymer can have the structure

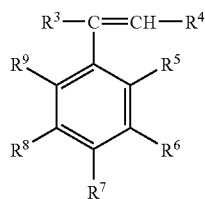

wherein $R^3$ and $R^4$ each independently represent a hydrogen atom, a $C_1$-$C_8$ alkyl group, or a $C_2$-$C_8$ alkenyl group; $R^5$ and $R^9$ each independently represent a hydrogen atom, or a $C_1$-$C_8$ alkyl group; and $R^6$, $R^7$, and $R^8$ each independently represent a hydrogen atom, a $C_1$-$C_8$ alkyl group, or a $C_2$-$C_8$ alkenyl group, or $R^5$ and $R^6$ are taken together with the central aromatic ring to form a naphthyl group, or $R^6$ and $R^7$ are taken together with the central aromatic ring to form a naphthyl group. Specific alkenyl aromatic monomers include, for example, styrene and methylstyrenes such as alpha-methylstyrene and p-methylstyrene. In some embodiments, the alkenyl aromatic monomer is styrene.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene consists of 1,3-butadiene.

The hydrogenated block copolymer is a copolymer comprising (A) at least one block derived from an alkenyl aromatic compound and (B) at least one block derived from a conjugated diene, wherein the aliphatic unsaturation in the (B) block is reduced at least 50 percent, specifically at least 70 percent, more specifically at least 90 percent, by hydrogenation. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a B block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B, wherein the molecular weight of each A block may be the same as or different from that of other A blocks, and the molecular weight of each B block may be the same as or different from that of other B blocks. In some embodiments, the hydrogenated block copolymer is a diblock copolymer, a triblock copolymer, or a combination thereof. In some embodiments, the hydrogenated block copolymer is a polystyrene-poly(ethylene-butylene)-polystyrene triblock copolymer.

In some embodiments, the hydrogenated block copolymer excludes the residue of monomers other than the alkenyl aromatic compound and the conjugated diene. In some embodiments, the block copolymer consists of blocks derived from the alkenyl aromatic compound and the conjugated diene. In these embodiments it does not comprise grafts formed from these or any other monomers; in these embodiments it also consists of carbon and hydrogen atoms and therefore excludes heteroatoms.

In other embodiments, the block copolymer includes the residue of one or more acid functionalizing agents, such as maleic anhydride.

Illustrative commercially available hydrogenated block copolymers include the polystyrene-poly(ethylene-propylene) diblock copolymers available from Iraton Polymers as Kraton G1701 and G1702; the polystyrene-poly(ethylene-butylene)-polystyrene triblock copolymers available from Iraton Polymers as Katon G1641, G1650, G1651, G1654, G1657, G1726, G4609, G4610, GRP-6598, RP-6924, MD-6932M, MD-6933, and MD-6939; the polystyrene-poly(ethylene-butylene-styrene)-polystyrene (S-EB/S-S) triblock copolymers available from Kraton Polymers as Kraton RP-6935 and RP-6936, the polystyrene-poly(ethylene-propylene)-polystyrene triblock copolymers available from Kraton Polymers as Kraton G1730; the maleic anhydride-grafted polystyrene-poly(ethylene-butylene)-polystyrene triblock copolymers available from Kraton Polymers as Kraton G1901, G1924, and MD-6684; the maleic anhydride-grafted polystyrene-poly(ethylene-butylene-styrene)-polystyrene triblock copolymer available from Kraton Polymers as Kraton MD-6670; the polystyrene-poly(ethylene-butylene)-polystyrene triblock copolymer comprising 67 weight percent polystyrene available from Asahi Kasei Elastomer as TUFTEC H1043; the polystyrene-poly(ethylene-butylene)-polystyrene triblock copolymer comprising 42 weight percent polystyrene available from Asahi Kasei Elastomer as TUFTEC H1051; the polystyrene-poly(butadiene-butylene)-polystyrene triblock copolymers available from Asahi Kasei Elastomer as TUFTEC P1000 and P2000; the polystyrene-polybutadiene-poly(styrene-butadiene)-polybutadiene block copolymer available from Asahi Kasei Elastomer as S.O.E.-SS L601; the polystyrene-poly(ethylene-butylene)-polystyrene triblock copolymer comprising about 60 weight polystyrene available from Kuraray as SEPTON S8104; the polystyrene-poly(ethylene-ethylene/propylene)-polystyrene triblock copolymers available from Kuraray as SEPTON S4044, S4055, S4077, and S4099; and the polystyrene-poly(ethylene-propylene)-polystyrene triblock copolymer comprising about 65 weight percent polystyrene available from Kuraray as SEPTON S2104. Mixtures of two of more hydrogenated block copolymers can be used.

In some embodiments, the hydrogenated block copolymer is a polystyrene-poly(ethylene-butylene)-polystyrene triblock copolymer provided in the form of a masterbatch comprising 50 to 95 weight percent of the polystyrene-poly(ethylene-butylene)-polystyrene triblock copolymer and 5 to 50 weight percent poly(arylene ether), based on the total weight of the masterbatch. Within the range of 50 to 95 weight percent, the amount of the polystyrene-poly(ethylene-butylene polystyrene triblock copolymer can be 75 to 95 weight percent, more specifically 85 to 95 weight percent. Within the range of 5 to 50 weight percent, the amount of the poly (arylene ether) can be 5 to 25 weight percent, specifically 5 to 15 weight percent. In some embodiments, the polystyrene-poly(ethylene-butylene)-polystyrene triblock copolymer used in the masterbatch is in the form of a powder prepared by cryogenic grinding, typically at a temperature of −75 to −200° C. For the embodiments in which the thermoplastic composition comprises a polystyrene-poly(ethylene-butylene)-polystyrene triblock copolymer in the form of a masterbatch, the poly(arylene ether) used in the masterbatch is part of the total poly(arylene ether) in the composition, and its chemical structure and molecular weight properties can be the same as or different from those of the remainder of the poly(arylene ether) in the composition.

The thermoplastic composition comprises 7 to 13 weight percent of the hydrogenated block copolymer, based on the total weight of the thermoplastic composition. Within this range, the hydrogenated block copolymer amount can be 8 to 12 weight percent, specifically 9 to 11 weight percent.

In addition to the poly(arylene ether), the homopolystyrene, and the hydrogenated block copolymer, the injection molding composition comprises a triaryl phosphate. Each of the aryl groups of the triaryl phosphate can be, independently of the others, a $C_6$-$C_{18}$ aryl group optionally substituted with 1 to 5 $C_1$-$C_{12}$ alkyl groups. In some embodiments, the triaryl phosphate is a liquid at one atmosphere and at least one temperature in the range 25 to 50° C. Triaryl phosphates include, for example, resorcinol bis(diphenyl phosphate), resorcinol bis(di-2,6-dimethylphenyl phosphate), bisphenol A bis(diphenyl phosphate), resorcinol bis(di-2,6-dimethylphenyl phosphate), alkylated triphenyl phosphates (such as methylated triphenyl phosphates and butylated triphenyl phosphates), and the like, and mixtures thereof.

The thermoplastic composition comprises 7 to 13 weight percent of the triaryl phosphate, based on the total weight of the thermoplastic composition. Within this range, the triaryl phosphate amount can be 8 to 12 weight percent, specifically 9 to 11 weight percent.

The thermoplastic composition can, optionally, further comprise a metal hydroxide as an auxiliary flame retardant. Suitable metal hydroxides include all those capable of providing fire retardancy, as well as combinations thereof. Exemplary metal hydroxides include, but are not limited to, magnesium hydroxide (CAS Reg. No. 1309-42-8), aluminum hydroxide (CAS Reg. No. 21645-51-2), cobalt hydroxide (CAS Reg. No. 21041-93-0) and combinations thereof. In some embodiments, the metal hydroxide comprises magnesium hydroxide. In some embodiments, the metal hydroxide has an average particle size less than or equal to 10 micrometers, specifically less than or equal to 5 micrometers, and/or a purity greater than or equal to 90 weight percent. In some embodiments it is desirable for the metal hydroxide to contain substantially no water, that is, to exhibit a weight loss of less than 1 weight percent upon drying at 120° C. for 1 hour. In some embodiments the metal hydroxide can be coated, for example, with stearic acid or another fatty acid. When present, the metal hydroxide can be used in an amount of 0.5 to 10 weight percent, specifically 2 to 8 weight percent, based on the total weight of the composition.

The thermoplastic composition comprises less than 1 weight percent of unhydrogenated poly(conjugated diene) rubber. Specifically, the thermoplastic composition can comprise less than 0.5 weight percent of unhydrogenated poly (conjugated diene) rubber. In some embodiments, the thermoplastic composition excludes unhydrogenated poly (conjugated diene) rubber. In the context of the unhydrogenated poly(conjugated diene) rubber, the conjugated diene is any conjugated diene, including those mentioned above in the context of the hydrogenated block copolymer. In the context of the unhydrogenated poly(conjugated diene) rubber, the word "unhydrogenated" means that less than 10 mole percent of the residual aliphatic unsaturation in the poly(conjugated diene) has been reduced by hydrogenation. The limitation on unhydrogenated poly(conjugated diene) rubber applies to the sum of all forms of such rubber, including homopolymers, and blocks and grafts within copolymers, but not including the residue of butadiene in random copolymers. For example, the limitation on unhydrogenated poly(conjugated diene) rubber applies to a polybutadiene homopolymer, and the polybutadiene content of a rubber-modified polystyrene, and the polybutadiene content of a polystyrene-polybutadiene-polystyrene triblock copolymer. The present inventors believe that the contribution of unhydrogenated block copolymer to die lip build-up has not previously been recognized. Accordingly, the reduction of die lip build-up by substantial or complete elimination of unhydrogenated block copolymer is believed to represent a previously unrecognized result-effective variable.

The thermoplastic composition can, optionally, further comprise 0.5 to 5 weight percent, specifically 1 to 4 weight percent, more specifically 1 to 3 weight percent, of an ethylene-butene copolymer. The ethylene-butene copolymer can have a viscosity average molecular weight of 3,500 to 6,000 atomic mass units, and a density of 0.88 to 0.92 gram/milliliter, specifically 0.89 to 0.91 gram/milliliter. The ethylene-butene copolymer can be prepared by methods known in the art. Suitable ethylene-butene copolymers are available commercially, including, for example, those sold as EXCEREX 30200B, EXCEREX 30200BT, EXCEREX 30200B2, EXCEREX 48070BT, and EXCEREX 40800T by Mitsui Chemicals.

The thermoplastic composition can, optionally, further comprise 0.025 to 0.5 weight percent, specifically 0.05 to 0.2 weight percent, of a copolymer (a fluorinated copolymer) of vinylidene fluoride and hexafluoropropylene having a fluorine content of 60 to 70 weight percent based on the total weight of the copolymer. In some embodiments, the copolymer of vinylidene fluoride and hexafluoropropylene comprises 50 to 70 weight percent of residues derived from vinylidene fluoride, and 30 to 50 weight percent of residues derived from hexafluoropropylene. Such fluorinated copolymers can be prepared by methods known in the art. They are also commercially available as, for example, Dynamar FX 9613 from Dyneon, which consists of 88-92 weight percent poly(vinylidene fluoride-co-hexafluoropropylene) having a fluorine content of 65.9±0.3% and a Mooney viscosity of 33±5, 4-9 weight percent talc, 1-4 weight percent synthetic amorphous silica, and <5% calcium carbonate. In some embodiments, the copolymer of vinylidene fluoride and hexafluoropropylene is provided in the form of a masterbatch comprising 2-10 weight percent of the copolymer of vinylidene fluoride and hexafluoropropylene and 90-98 weight percent low density polyethylene, based on the total weight of the masterbatch.

In some embodiments, the thermoplastic composition further comprises colorants, including dyes and pigments. For example, when the pipe is intended for use as electrical conduit, the thermoplastic composition may further comprises colorants effective to produce an "electrical gray" appearance in the finished pipe. In some embodiments, the composition comprises titanium dioxide in an amount of 3 to 9 weight percent, specifically 4 to 8 weight percent, more specifically 5 to 7 weight percent, all based on the total weight of the thermoplastic composition. As demonstrated in the working examples below, additional colorants may be used in conjunction with the titanium dioxide to achieve the "electrical gray" appearance.

In some embodiments, the thermoplastic composition further comprises one or more additives known in the thermoplastic arts, including, for example, stabilizers, antioxidants, mold release agents, drip retardants, nucleating agents, UV blockers, dyes, pigments, fragrances, anti-static agents, mineral oil, metal deactivators, antiblocking agents, fillers having a particle size less than or equal to 5 micrometers (including calcium carbonates and nanoclays), and the like, and combinations thereof.

In some embodiments the thermoplastic composition excludes polyolefins other than the optional ethylene-butene copolymer and the low density polyethylene present in the optional fluorinated polymer masterbatch. In some embodiments, the composition comprises less than or equal to 5 weight percent total of all polyolefins, wherein the term polyolefins is defined as polymers derived from monomers consisting of one or more $C_2$-$C_{12}$ alkenes.

In some embodiments, the thermoplastic composition excludes polyamides.

In some embodiments, the thermoplastic composition excludes any polymer other than those taught herein as required or optional.

In some embodiments, the thermoplastic composition comprises less than 0.1 weight percent of fillers having any dimension greater than 5 micrometers, including reinforcing fillers and conductive fillers. In some embodiments, the thermoplastic composition excludes such fillers. In this context, it will be understood that the term "fillers" excludes the pigments mentioned above in the context of colorants.

The thermoplastic composition exhibits an Izod notched impact strength at −30° C. of at least 6 kilojoules/meter$^2$, as measured according to ISO 180 using notch configuration A. Specifically, the Izod notched impact strength at −30° C. can be 6 to 12 kilojoules/meter$^2$, more specifically 8 to 12 kilojoules/meter$^2$, more specifically 8 to 12 kilojoules/meter$^2$, more specifically 9 to 11 kilojoules/meter$^2$.

The thermoplastic composition also exhibits a Vicat B value of at least 125° C., measured according to ISO 306, Method B120. Specifically, the Vicat B value can be 125 to 145° C., more specifically 130 to 140° C.

An important advantage of the present method is that it substantially reduces die lip build-up during profile extrusion. Specifically, the average die lip build-up per hour measured over the course of 8 continuous hours of extrusion of the thermoplastic composition, measured as described in the working examples, is less than that produced by a corresponding thermoplastic composition in which the hydrogenated block copolymer is replaced by an equal weight of a corresponding unhydrogenated block copolymer. In some embodiments, the die lip build-up is reduced by at least 50%, specifically at least 70%, more specifically at least 90%. In some embodiments, the average die lip build-up per hour measured over the course of 8 continuous hours of extrusion of the thermoplastic composition is less than or equal to 5 milligrams per hour, specifically 1 to 5 milligrams per hour, measured as described in the working examples.

In some embodiments, the thermoplastic composition exhibits at least one of a flexural strength of at least 95 megapascals, specifically 95 to 100 megapascals, measured at 23° C. according to ISO 178; a notched Izod impact strength of at least 20 kilojoules/meter$^2$, specifically 20 to 25 kilojoules/meter$^2$, measured at 23° C. according to ISO 180 using notch configuration A; a Charpy notched impact strength of at least 20 kilojoules/meter$^2$, specifically 20 to 30 kilojoules/meter$^2$, more specifically 21 to 27 kilojoules/meter$^2$, measured at 23° C. according to ISO 179 using notch type A, and a tensile strength at yield of at least 60 megapascals, specifically 60 to 70 megapascals, measured at 23° C. according to ISO 527.

In a very specific embodiment of the method, the thermoplastic composition comprises 57 to 61 weight percent of a poly(arylene ether), 17 to 21 weight percent of a homopolystyrene, 8 to 12 weight percent of a polystyrene-poly(ethylene-butylene)-polystyrene triblock copolymer, 8 to 12 weight percent of a triaryl phosphate, 3 to 9 weight percent titanium dioxide, and 1 to 3 weight percent of an ethylene-butene copolymer having a viscosity average molecular weight of 3,500 to 6,000 atomic mass units, a density of 0.88 to 0.92 gram/milliliter, and a viscosity of 1,000 to 1,500 millipascal-seconds at 140° C.; the thermoplastic composition comprises less than 0.5 weight percent of unhydrogenated poly(conjugated diene) rubber; the thermoplastic composition exhibits an Izod notched impact strength at −30° C. of 6 to 12 kilojoules/meter$^2$, and a Vicat B value of 125 to 145° C., measured according to ISO 306, Method B120; the average die lip build-up per hour measured over the course of 8 continuous hours of extrusion of the thermoplastic composition is 1 to 5 milligrams per hour; the hydrogenated block copolymer comprises a polystyrene-poly(ethylene-butylene)-polystyrene triblock copolymer; and the thermoplastic composition exhibits Method B120, a flexural strength of 95 to 100 megapascals, measured at 23° C. according to ISO 178, a notched Izod impact strength of 20 to 25 kilojoules/meter$^2$, measured at 23° C. according to ISO 180 using notch configuration A, a Charpy notched impact strength of 20 to 30 kilojoules/meter$^2$, measured at 23° C. according to ISO 179 using notch type A, and a tensile strength at yield of 60 to 70 megapascals, measured at 23° C. according to ISO 527.

Another embodiment is a profile extruded article, produced by a process comprising: extruding through a die a thermoplastic composition having a temperature of 220 to 240° C.; and cooling the extruded composition to form an extruded thermoplastic article; wherein the thermoplastic composition comprises 56 to 62 weight percent of a poly(arylene ether), 16 to 22 weight percent of a homopolystyrene, 7 to 13 weight percent of a hydrogenated block copolymer of an alkenyl aromatic compound and a conjugated diene, and 7 to 13 weight percent of a triaryl phosphate; wherein the thermoplastic composition comprises less than 1 weight percent of unhydrogenated poly(conjugated diene) rubber; wherein all weight percents are based on the total weight of the thermoplastic composition; wherein the thermoplastic composition exhibits an Izod notched impact strength at −30° C. of at least 6 kilojoules/meter$^2$, as measured according to ISO 180 using notch configuration A, and a Vicat B value of at least 125° C., measured according to ISO 306, Method B120; wherein extrusion of the thermoplastic composition over the course of 8 continuous hours produces an average die lip build-up per hour less than or equal to 5 milligrams per hour, measured as described in the working examples. All of the embodiments described above in the context of the method are applicable to the profile extruded article. In some embodiments, the profile extruded article is substantially free of visible residue of die lip build-up, as determined by visible inspection of the extruded article.

In a very specific embodiment of the profile-extruded article, the thermoplastic composition comprises 57 to 61 weight percent of a poly(arylene ether), 17 to 21 weight percent of a homopolystyrene, 8 to 12 weight percent of a polystyrene-poly(ethylene-butylene)-polystyrene triblock copolymer, 8 to 12 weight percent of a triaryl phosphate, 3 to 9 weight percent titanium dioxide, and 1 to 3 weight percent of an ethylene-butene copolymer having a viscosity average molecular weight of 3,500 to 6,000 atomic mass units, a density of 0.88 to 0.92 gram/milliliter, and a viscosity of 1,000 to 1,500 millipascal-seconds at 140° C.; the thermoplastic composition comprises less than 0.5 weight percent of unhydrogenated poly(conjugated diene) rubber; the thermoplastic composition exhibits an Izod notched impact strength at −30° C. of 6 to 12 kilojoules/meter$^2$, and a Vicat B value of 125 to 145° C., measured according to ISO 306, Method B120; the die lip build-up produced by the thermoplastic composition is 1 to 5 milligrams per hour; the hydrogenated block copolymer comprises a polystyrene-poly(ethylene-butylene)-polystyrene triblock copolymer; and the thermoplastic composition exhibits at least one of a flexural strength of 95 to 100 megapascals, measured at 23° C. according to ISO 178, a notched Izod impact strength of 20 to 25 kilojoules/meter$^2$, measured at 23° C. according to ISO 180 using notch configuration A, a Charpy notched impact strength of 20 to 30 kilojoules/meter$^2$, measured at 23° C. according to ISO 179 using notch type A, and a tensile strength at yield of 60 to 70 megapascals, measured at 23° C. according to ISO 527.

The invention includes at least the following embodiments.

Embodiment 1

A method of reducing die lip build-up during profile extrusion of a thermoplastic article, comprising: extruding through a die a thermoplastic composition having a temperature of 220 to 240° C.; and cooling the extruded composition to form an extruded thermoplastic article; wherein the thermoplastic composition comprises 56 to 62 weight percent of a poly(arylene ether), 16 to 22 weight percent of a homopolystyrene, 7 to 13 weight percent of a hydrogenated block copolymer of an alkenyl aromatic compound and a conjugated diene, and 7 to 13 weight percent of a triaryl phosphate; wherein the thermoplastic composition comprises less than 1 weight percent of unhydrogenated poly(conjugated diene) rubber; wherein all weight percents are based on the total weight of the thermoplastic composition; wherein the thermoplastic composition exhibits an Izod notched impact strength at −30° C. of at least 6 kilojoules/meter$^2$, as measured according to ISO 180 using notch configuration A, and a Vicat B value of at least 125° C., measured according to ISO 306, Method B120; wherein the extruding the thermoplastic composition produces an average die lip build-up per hour measured over the course of 8 continuous hours of extrusion of the thermoplastic composition, measured as described in the working examples; and wherein the average die lip build-up is less than that produced by a corresponding thermoplastic composition in which the hydrogenated block copolymer is replaced by an equal weight of an unhydrogenated block copolymer.

Embodiment 2

The method of embodiment 1, wherein the average die lip build-up per hour measured over the course of 8 continuous hours of extrusion of the thermoplastic composition is less than or equal to 5 milligrams per hour.

Embodiment 3

The method of embodiment 1 or 2, wherein the average die lip build-up per hour measured over the course of 8 continuous hours of extrusion of the thermoplastic composition is 1 to 5 milligrams per hour.

Embodiment 4

The method of any of embodiments 1-3, wherein the hydrogenated block copolymer of an alkenyl aromatic compound and a conjugated diene is a polystyrene-poly(ethylene-butylene)-polystyrene triblock copolymer.

Embodiment 5

The method of embodiment 4, wherein the polystyrene-poly(ethylene-butylene)-polystyrene triblock copolymer is provided in the form of a masterbatch comprising 50 to 95 weight percent of the polystyrene-poly(ethylene-butylene)-polystyrene triblock copolymer and 5 to 50 weight percent poly(arylene ether), based on the total weight of the masterbatch.

Embodiment 6

The method of any of embodiments 1-5, wherein the thermoplastic composition further comprises 0.5 to 5 weight percent of an ethylene-butene copolymer having a viscosity average molecular weight of 3,500 to 6,000 atomic mass units, and a density of 0.88 to 0.92 gram/milliliter.

Embodiment 7

The method of any of embodiments 1-6, wherein the thermoplastic composition further comprises 0.025 to 0.5 weight percent of a copolymer of vinylidene fluoride and hexafluoropropylene having a fluorine content of 60 to 70 weight percent based on the total weight of the copolymer.

Embodiment 8

The method of embodiment 7, wherein the copolymer of vinylidene fluoride and hexafluoropropylene is provided in the form of a masterbatch comprising 2 to 10 weight percent of the copolymer of vinylidene fluoride and hexafluoropropylene and 90 to 98 weight percent low density polyethylene, based on the total weight of the masterbatch.

Embodiment 9

The method of any of embodiments 1-8, wherein the thermoplastic composition further comprises 3 to 9 weight percent titanium dioxide.

Embodiment 10

The method of embodiment 1, wherein the thermoplastic composition exhibits at least one of a flexural strength of at least 95 megapascals, measured at 23° C. according to ISO 178, a notched Izod impact strength of at least 20 kilojoules/meter$^2$, measured at 23° C. according to ISO 180 using notch configuration A, a Charpy notched impact strength of at least 20 kilojoules/meter$^2$, measured at 23° C. according to ISO 179 using notch type A, and a tensile strength at yield of at least 60 megapascals, measured at 23° C. according to ISO 527.

Embodiment 11

The method of embodiment 1, wherein the thermoplastic composition comprises 57 to 61 weight percent of a poly(arylene ether), 17 to 21 weight percent of a homopolystyrene, 8 to 12 weight percent of a polystyrene-poly(ethylene-butylene)-polystyrene triblock copolymer, 8 to 12 weight percent of a triaryl phosphate, 3 to 9 weight percent titanium dioxide, and 1 to 3 weight percent of an ethylene-butene copolymer having a viscosity average molecular weight of 3,500 to 6,000 atomic mass units, a density of 0.88 to 0.92 gram/milliliter, and a viscosity of 1,000 to 1,500 millipascal-seconds at 140° C.; wherein the thermoplastic composition comprises less than 0.5 weight percent of unhydrogenated poly(conjugated diene) rubber; wherein the thermoplastic composition exhibits an Izod notched impact strength at −30° C. of 6 to 12 kilojoules/meter$^2$, and a Vicat B value of 125 to 145° C., measured according to ISO 306, Method B120; wherein the average die lip build-up per hour measured over the course of 8 continuous hours of extrusion of the thermoplastic composition is 1 to 5 milligrams per hour; wherein the hydrogenated block copolymer comprises a polystyrene-poly(ethylene-butylene)-polystyrene triblock copolymer; and wherein the thermoplastic composition exhibits at least one of a flexural strength of 95 to 100 megapascals, measured at 23° C. according to ISO 178, a notched Izod impact strength of 20 to 25 kilojoules/meter$^2$, measured at 23° C. according to ISO 180 using notch configuration A, a Charpy notched impact strength of 20 to 30 kilojoules/meter$^2$, measured at 23° C. according to ISO 179 using notch type A, and a tensile strength at yield of 60 to 70 megapascals, measured at 23° C. according to ISO 527.

Embodiment 12

A profile extruded article, produced by a process comprising: extruding through a die a thermoplastic composition having a temperature of 220 to 240° C.; and cooling the extruded composition to form an extruded thermoplastic article; wherein the thermoplastic composition comprises 56 to 62 weight percent of a poly(arylene ether), 16 to 22 weight percent of a homopolystyrene, 7 to 13 weight percent of a hydrogenated block copolymer of an alkenyl aromatic compound and a conjugated diene, and 7 to 13 weight percent of a triaryl phosphate; wherein the thermoplastic composition comprises less than 1 weight percent of unhydrogenated poly(conjugated diene) rubber; wherein all weight percents are based on the total weight of the thermoplastic composition; wherein the thermoplastic composition exhibits an Izod notched impact strength at −30° C. of at least 6 kilojoules/meter$^2$, as measured according to ISO 180 using notch configuration A, and a Vicat B value of at least 125° C., measured according to ISO 306, Method B120; wherein extrusion of the thermoplastic composition over the course of 8 continuous hours produces an average die lip build-up per hour less than or equal to 5 milligrams per hour, measured as described in the working examples.

Embodiment 13

The profile-extruded article of embodiment 12, wherein the profile extruded article is substantially free of visible residue of die lip build-up.

Embodiment 14

The profile-extruded article of embodiment 12 or 13, wherein the thermoplastic composition comprises 57 to 61 weight percent of a poly(arylene ether), 17 to 21 weight percent of a homopolystyrene, 8 to 12 weight percent of a polystyrene-poly(ethylene-butylene)-polystyrene triblock copolymer, 8 to 12 weight percent of a triaryl phosphate, 3 to 9 weight percent titanium dioxide, and 1 to 3 weight percent of an ethylene-butene copolymer having a viscosity average molecular weight of 3,500 to 6,000 atomic mass units, a density of 0.88 to 0.92 gram/milliliter, and a viscosity of 1,000 to 1,500 millipascal-seconds at 140° C.; wherein the thermoplastic composition comprises less than 0.5 weight percent of unhydrogenated poly(conjugated diene) rubber; wherein the thermoplastic composition exhibits an Izod notched impact strength at −30° C. of 6 to 12 kilojoules/meter$^2$, and a Vicat B value of 125 to 145° C., measured according to ISO 306, Method B120; wherein the die lip build-up produced by the thermoplastic composition is 1 to 5 milligrams per hour; wherein the hydrogenated block copolymer comprises a polystyrene-poly(ethylene-butylene)-polystyrene triblock copolymer; and wherein the thermoplastic composition exhibits at least one of a flexural strength of 95 to 100 megapascals, measured at 23° C. according to ISO 178, a notched Izod impact strength of 20 to 25 kilojoules/meter$^2$, measured at 23° C. according to ISO 180 using notch configuration A, a Charpy notched impact strength of 20 to 30 kilojoules/meter$^2$, measured at 23° C. according to ISO 179 using notch type A, and a tensile strength at yield of 60 to 70 megapascals, measured at 23° C. according to ISO 527.

The invention is further illustrated by the following non-limiting examples.

Examples 1-4, Comparative Examples 1-7

These examples illustrate the reduced beard growth observed when the extruded composition comprises a hydrogenated block copolymer and is substantially free of unhydrogenated poly(conjugated diene) rubber.

Components used to form the compositions are described in Table 1.

The component designated "SEBS/PPE" was prepared by cryogenic grinding of 90 weight percent polystyrene-poly(ethylene-butylene)-polystyrene triblock copolymer and subsequent dry blending with 10 weight percent poly(2,6-dimethyl-1,4-phenylene ether) powder. The present inventors have observed that this initial dry blending step significantly improves the dispersion of the polystyrene-poly(ethylene-butylene)-polystyrene triblock copolymer in the composition compared to a composition prepared without grinding the polystyrene-poly(ethylene-butylene)-polystyrene triblock copolymer and pre-blending it with poly(arylene ether).

The component designated "FP/LDPE" (for fluoropolymer in low density polyethylene) is the milled form of a pre-compounded masterbatch of 5 weight percent Dynamar FX 9613 from Dyneon (which consists of 88-92 weight percent poly(vinylidene fluoride-co-hexafluoropropylene) having a fluorine content of 65.9±0.3% and a Mooney viscosity of 33±5, 4-9 weight percent talc, 1-4 weight percent synthetic amorphous silica, and <5% calcium carbonate) in 95 weight percent low density polyethylene (obtained as PA0833 LD from Constab Polymer-chemic GmbH&Co.).

The component designated "LDPE" was obtained by cryogenic milling of low density polyethylene (obtained as STAMYLAN LD1922T from SABIC Europe) to yield a powder with median particle size of 1,000 micrometers.

TABLE 1

| Component | Description |
|---|---|
| PPE 0.3 IV | Poly(2,6-dimethyl-1,4-phenylene ether), CAS Reg. No. 25134-01-4, having an intrinsic viscosity of 0.3 deciliter per gram as measured in chloroform at 25° C.; obtained in powder form as PPO 808 from SABIC Innovative Plastics. |
| PPE 0.40 IV | Poly(2,6-dimethyl-1,4-phenylene ether), CAS Reg. No. 25134-01-4, having an intrinsic viscosity of 0.40 deciliter per gram as measured in chloroform at 25° C.; obtained in powder form as PPO 803 from SABIC Innovative Plastics. |
| PPE 0.46 IV | Poly(2,6-dimethyl-1,4-phenylene ether), CAS Reg. No. 25134-01-4, having an intrinsic viscosity of 0.46 deciliter per gram as measured in chloroform at 25° C.; obtained in powder form as PPO 800 from SABIC Innovative Plastics. |
| PPE 0.56 IV | Poly(2,6-dimethyl-1,4-phenylene ether), CAS Reg. No. 25134-01-4, having an intrinsic viscosity of 0.56 deciliter per gram as measured in chloroform at 25° C.; obtained in powder form as PPO 800 from SABIC Innovative Plastics. |
| HIPS | High impact polystyrene (rubber-modified polystyrene), CAS Reg. No. 9003-55-8, comprising 89.5-90.5 weight percent polystyrene and 9.5-10.5 weight percent polybutadiene, obtained in pellet form as Empera 641F from NOVA Innovene. |
| PS | Homopolystyrene, CAS Reg. No. 9003-53-6, having a weight average molecular weight of about 280,000, obtained in pellet form as CC-PS 251N from NOVA Innovene. |
| HMWPS | Homopolystyrene, CAS Reg. No. 9003-53-6, have a weight average molecular weight of at least 800,000 atomic mass units obtained in pellet form as Blendex 865 from Chemtura. |
| SBS | Polystyrene-polybutadiene-polystyrene triblock copolymer, CAS Reg. No. 9003-55-8, having a polystyrene content of 31 weight percent, obtained in pellet form as KRATON D1102CS from Kraton Polymers. |
| SEBS | Polystyrene-poly(ethylene-butylene)-polystyrene triblock copolymer, CAS Reg. No. 66070-58-4, having a polystyrene content of 31 weight percent and a weight average molecular weight of about 240,000 to about 300,000 atomic mass units, obtained in powder form as Kraton G1651 from Kraton Polymers. |
| SEBS/PPE | Dry blend consisting of 90 weight percent polystyrene-poly(ethylene-butylene)-polystyrene triblock copolymer (Kraton G1651) and 10 weight percent poly(2,6-dimethyl-1,4-phenylene ether) (having an intrinsic viscosity of 0.4 deciliter per gram, obtained as PPO 803 from SABIC Innovative Plastics) |
| BPADP | Bisphenol A bis(diphenyl phosphate), CAS Reg. No. 5945-33-5, obtained from Albemarle. |
| RDP | Resorcinol bis(diphenyl phosphate), CAS Reg. No. 57583-54-7, obtained as REOFOS RDP from Chemtura. |
| Phosphite A | Tris(2,4-di-tert-butylphenyl)phosphite, CAS Reg. No. 31570-04-4, obtained as IRGAFOS 168 from Ciba Specialty Chemicals, or from Chemtura or Everspring. |
| Phosphite B | Tris(nonylphenyl)phosphite; or a mixture of triphenyl phosphite, phosphorous acid, diisodecylphenyl phosphite, tri(nonylphenyl)phosphite, diphenylisodecylphosphite, and 4-nonylphenol. |
| ZnO | Zinc oxide, CAS Reg. No. 1314-13-2, obtained in powder form from Norzinco. |
| ZnS | Zinc sulfide, CAS Reg. No. 1314-98-3, obtained in powder form from Sachtleben Chemie. |
| Zinc stearate | Zinc stearate, CAS Reg. No. 68131-61-3, obtained in powder form from Peter Greven. |
| PTFE | Polytetrafluoroethylene, CAS Reg. No. 9002-84-0, obtained in powder form from Solvay Solexis. |
| FP/LDPE | Masterbatch consisting of 95 weight percent low density polyethylene (obtained as PA0833 LD from Constab Polymer-chemie GmbH&Co.) and 5 weight percent Dynamar FX 9613 from Dyneon, which consists of 88-92 weight percent poly(vinylidene fluoride-co-hexafluoropropylene) having a fluorine content of 65.9 ± 0.3% and a Mooney viscosity of 33 ± 5, 4-9 weight percent talc, 1-4 weight percent synthetic amorphous silica, and <5% calcium carbonate. |
| LDPE | Milled low density polyethylene, CAS Reg. No. 9002-88-4, obtained as STAMYLAN LD 1922 T from SABIC Innovative Plastics and milled by Smile Plastics. |
| PE wax | Polyethylene wax, CAS Reg. No. 9002-88-4, obtained in powder form as Luwax A Powder from BASF. |
| PEPG | Polyoxyethylene-polyoxypropylene block copolymer, CAS Reg. No. 9003-11-6, obtained in powder form as PLURONIC F88 from BASF and cryogenically milled by Smile Plastics. |
| EB | Ethylene-butene copolymer, CAS Reg. No. 9019-29-8, having a viscosity average molecular weight of 4,600 atomic mass units, a density of 0.902 gram/milliliter, a melting point of 90° C., and a |

TABLE 1-continued

| Component | Description |
|---|---|
| | viscosity of 1300 millipascal-seconds at 140° C.; obtained as EXCEREX 48070BT from Mitsui Chemicals. |
| $TiO_2$ | Titanium dioxide, CAS Reg. No. 13463-67-7, obtained in powder form as KRONOS 2450 from Huntsman. |
| Red 101 | Pigment Red 101 (ferric oxide), CAS Reg. No. 1309-37-1, obtained in powder form from Lanxess |
| Green 17 | Pigment Green 17 (chromium (III) oxide), CAS Reg. No. 1308-38-9, obtained in powder form from Lanxess |
| Blue 29 | Pigment Blue 29 (polysulfide of sodiumaluminum silicate), CAS Reg. No. 57455-37-5, obtained in powder form from Holliday Pigments |
| AO | Octadecyl 3,5-di-(tert)-butyl-4-hydroxyhydrocinnamate, CAS Reg. No. 2082-79-3, obtained in pellet form as IRGANOX 1076 from Ciba Specialty Chemicals |

The compositions of seven comparative and four inventive compositions are presented in Table 2, where component amounts are given in parts by weight. Compositions were compounded using a Werner & Pfleiderer ZSF120 twin-screw extruder having an internal diameter of 120 millimeters and 13 zones having temperatures of 290/290/310/290/270/270/270/250/250/300/300/310/310/300° C. from feed throat to die. BPADP was added to the extruder via a liquid feeder at zone 6, polystyrene was fed at the feed throat with a separate feeder, and the remaining components were dry blended and fed via a powder feeder at the feed throat. The extrudate was cooled and pelletized. Test articles for physical property and flammability testing were injection molded using four-zone barrel temperatures of 260/270/280/275° C. and a mold temperature of 80° C.

Melt viscosity values, expressed in units of pascal-seconds, were measured at 280° C. and a shear rate of 1500 $sec^{-1}$ according to ISO 11443. Melt volume-flow rate values, expressed in units of $centimeter^3$/10 minutes, were measured at 280° C. and 5 kilogram load according to ISO 1133.

UL94 (flammability) ratings were determined according to UL 94, "Test for Flammability of Plastic Materials for Parts in Devices and Appliances", Fifth Edition (1996), Vertical Burning Test using a sample thickness of 1.5 millimeters. The UL 94 protocol calls for bar-shaped specimens of dimensions 5 inches (12.7 centimeters)×½ inch (1.3 centimeter) width× the desired normal thickness, UL 94 ratings being specified for a particular thickness. A flame having an inner cone of height ¾ inch (1.9 centimeters) is applied to each specimen so that a distance of ⅜ inch (1.0 centimeter) separates the lower end of the specimen from the base of the flame. The flame is held in that position for 10 seconds and then removed. A burn time is defined as the time required for the flame issuing from the specimen to disappear. If burning of the specimen ceases within 30 seconds, the flame is reapplied for an additional 10 seconds. The criteria for V-0, V-1, and V-2 ratings are listed below.

| | V-0 | V-1 | V-2 |
|---|---|---|---|
| Maximum individual burn time (sec) | 10 | 30 | 30 |
| Maximum total burn time (sec) | 50 | 250 | 250 |
| Maximum glowing time (sec) | 30 | 60 | 60 |
| Drip particles that ignite cotton | no | no | yes |

For a V-0 rating, no individual burn times, from the first or second application may exceed 10 seconds. The total of the burn times for any five specimens may not exceed 50 seconds. Drip particles that ignite a piece of cotton gauze situated below the specimen are not allowed. For a V-1 rating, no individual burn times, from the first or second application may exceed 30 seconds. The total of the burn times for any five specimens may not exceed 250 seconds. Drip particles that ignite a piece of cotton gauze situated below the specimen are not allowed.

Heat deflection temperature values, expressed in degrees centigrade, were measured according to ISO 75, Method A (using a flexural stress of 1.80 megapascals). Vicat B values, expressed in degrees centigrade, were measured according to ISO 306, Method B120. Flexural modulus values, expressed units of megapascals, and flexural strength values, also expressed in units of megapascals, were measured at 23° C. according to ISO 178. Notch and Unnotched Izod impact strength values, expressed in units of kilojoules/$meter^2$, were measured at 23° C. and −30° C. according to ISO 180, using notch configuration A. Tensile modulus values and tensile strength values, both expressed in megapascals, as well as tensile strain at break values, expressed in percent, were determined at 23° C. according to ISO 527.

The results, presented in Table 2, demonstrate that the addition of the fluorinated polymer/LLDPE at 1.5 parts by weight or the poly(ethylene-butene) at 2 parts by weight had little effect on the physical properties and flame retardancy of the composition, whether the composition includes or excludes poly(conjugated diene) rubber.

TABLE 2

| | C. Ex. 1 | C. Ex. 2 | C. Ex. 3 | C. Ex. 4 | C. Ex. 5 |
|---|---|---|---|---|---|
| COMPOSITIONS | | | | | |
| PPE 0.46 IV | 58 | 58 | 58 | 58 | 58 |
| SBS | 6 | 6 | 6 | 6 | 6 |
| Phosphite A | 0.3 | 0.3 | 0.3 | 0.3 | 0.3 |
| AO | 0.5 | 0.5 | 0.5 | 0.5 | 0.5 |
| ZnO | 0.1 | 0.1 | 0.1 | 0.1 | 0.1 |
| ZnS | 0.1 | 0.1 | 0.1 | 0.1 | 0.1 |

TABLE 2-continued

|  |  |  |  |  |  |
|---|---|---|---|---|---|
| TiO$_2$ | 6 | 6 | 6 | 6 | 6 |
| SEBS/PPE | 0 | 0 | 0 | 0 | 0 |
| FP/LDPE | 0 | 1.5 | 1.5 | 1.5 | 0 |
| EB | 0 | 0 | 0 | 0 | 2 |
| HIPS | 22 | 22 | 22 | 22 | 22 |
| PS | 0 | 0 | 0 | 0 | 0 |
| BPADP | 13 | 8 | 10 | 12 | 8 |
| PROPERTIES |  |  |  |  |  |
| Melt visc., 280° C., 1500 s$^{-1}$ (Pa-s) | 230 | 260 | 261 | 242 | 297 |
| MVR, 280° C., 5 kg (cc$^3$/10 min) | 8 | 9 | 10 | 6 | 8 |
| UL 94, 1.5 mm | V0 | V0 | V0 | V0 | V0 |
| HDT A, 1.8 MPa (° C.) | 106 | 112 | 111 | 107 | 117 |
| Vicat B, B120 (° C.) | 128 | 134 | 134 | 130 | 139 |
| Flex. Mod., 23° C. (MPa) | 2795 | 2636 | 2648 | 2660 | 2589 |
| Flex. Strength, 23° C. (MPa) | 101 | 96 | 96 | 96 | 95 |
| Notched Izod, 23° C. (kJ/m$^2$) | 18 | 22 | 22 | 22 | 22 |
| Unnotched Izod, 23° C. (kJ/m$^2$) | 97 | 115 | 106 | 111 | 124 |
| Notched Izod, −30° C. (kJ/m$^2$) | 11 | 14 | 13 | 12 | 14 |
| Unnotched Izod, −30° C. (kJ/m$^2$) | 73 | 78 | 102 | 62 | 100 |
| Tensile Mod., 23° C. (MPa) | 2529 | 2415 | 2424 | 2428 | 2396 |
| Tensile Strength @ yield, 23° C. (MPa) | 64 | 62 | 62 | 62 | 61 |
| Tensile Strain @ Break (%) | 10 | 12 | 12 | 9 | 11 |

|  | C. Ex. 6 | C. Ex. 7 | Ex. 1 | Ex. 2 | Ex. 3 | Ex. 4 |
|---|---|---|---|---|---|---|
| COMPOSITIONS |  |  |  |  |  |  |
| PPE 0.46 IV | 58 | 58 | 57 | 57 | 57 | 57 |
| SBS | 6 | 6 | 0 | 0 | 0 | 0 |
| Phosphite A | 0.3 | 0.3 | 0.3 | 0.3 | 0.3 | 0.3 |
| AO | 0.5 | 0.5 | 0.5 | 0.5 | 0.5 | 0.5 |
| ZnO | 0.1 | 0.1 | 0.1 | 0.1 | 0.1 | 0.1 |
| ZnS | 0.1 | 0.1 | 0.1 | 0.1 | 0.1 | 0.1 |
| TiO$_2$ | 6 | 6 | 6 | 6 | 6 | 6 |
| SEBS/PPE | 0 | 0 | 10.4 | 10.4 | 10.4 | 10.4 |
| FP/LDPE | 0 | 0 | 0 | 0 | 0 | 0 |
| EB | 2 | 2 | 0 | 2 | 2 | 2 |
| HIPS | 22 | 22 | 0 | 0 | 0 | 0 |
| PS | 0 | 0 | 22 | 22 | 22 | 22 |
| BPADP | 10 | 12 | 13 | 8 | 10 | 12 |
| PROPERTIES |  |  |  |  |  |  |
| Melt visc., 280° C., 1500 s$^{-1}$ (Pa-s) | 260 | 216 | 204 | 259 | 224 | 186 |
| MVR, 280° C., 5 kg (cc$^3$/10 min) | 28 | 19 | 10 | 14 | 21 | — |
| UL 94, 1.5 mm | V0 | V0 | V0 | V0 | V0 | V0 |
| HDT A, 1.8 MPa (° C.) | 110 | 103 | 106 | 117 | 112 | 105 |
| Vicat B, B120 (° C.) | 133 | 126 | 129 | 140 | 135 | 128 |
| Flex. Mod., 23° C. (MPa) | 2598 | 2555 | 2681 | 2524 | 2541 | 2579 |
| Flex. Strength, 23° C. (MPa) | 94 | 92 | 102 | 97 | 98 | 97 |
| Notched Izod, 23° C. (kJ/m$^2$) | 24 | 23 | 20 | 23 | 23 | 22 |
| Unnotched Izod, 23° C. (kJ/m$^2$) | 137 | 132 | 83 | 124 | 128 | 111 |
| Notched Izod, −30° C. (kJ/m$^2$) | 13 | 13 | 7 | 7 | 7 | 6 |
| Unnotched Izod, −30° C. (kJ/m$^2$) | 80 | 69 | 56 | 97 | 64 | 57 |
| Tensile Mod., 23° C. (MPa) | 2427 | 2469 | 2640 | 2477 | 2528 | 2521 |
| Tensile Strength @ yield, 23° C. (MPa) | 61 | 61 | 66 | 66 | 66 | 65 |
| Tensile Strain @ Break (%) | 10 | 10 | 7 | 8 | 6 | 8 |

Examples 5-7, Comparative Examples 8-17

These examples demonstrate the advantage of the inventive method in reducing beard growth during profile extrusion.

Compositions and properties are summarized in Table 4. Charpy notched impact strength values, expressed in units of kilojoules/meter$^2$, were measured at 23° C. according to ISO 179.

The following conditions were used for pipe extrusion. Pre-compounded compositions in pellet form were extruded into pipes on a ME60/4×25D single screw extruder with a variable screw speed of 7-72 rotations per minute and a maximum throughput of 60-70 kilograms per hour. The extruder is equipped with an annular die with an outside diameter of 24.6 millimeters and an inside diameter of 21.35 millimeters. Additional details of the processing conditions are presented in Table 3, where "Adapter" refers to a metal part that connects the barrel and the die; "Distance/die calibrator" is the distance from exit of the die to the entry of the calibrator, with shorter distances yielding better aesthetics in the finished profile extruded article; and "Cooling bath vacuum" refers to the vacuum applied to the inside of the profile extruded article (pipe) as it flows through the water cooling bath (the vacuum "pulls" the outside surface of the hot pipe onto the inner surface of the calibrators to produce a smooth and regular outer surface on the finished pipe). In Table 3, the melt temperature is higher than the barrel and die temperatures because of shear heating of the melt.

Pipes were extruded for 8 hours continuously without modifying conditions and the beard-growth was observed during the extrusion. Except for those formed from the Comparative Example 12 composition, all pipes had a uniform weight of 90-94 grams per meter and uniform pipe wall thickness of 1.3-1.4 millimeters. The pipes formed from the Comparative Example 12 composition exhibited severe deformation. At the end of the 8 hour period, any "beard" material adhered to the extrusion head was removed and weighed. The beard growth rate, expressed in milligrams per hour, was calculated by dividing the eight-hour beard weight, in milligrams, by 8 hours.

Photographs showing beard growth accumulation (or lack thereof) for several samples are presented in FIG. 1: (a) Comparative Example 9; (b) Comparative Example 10; (c) Example 5; (d) Example 6; (e) Example 7; (f) Comparative Example 8; (g) Comparative Example 11; (h) Comparative Example 14; (i) Comparative Example 15; (j) Comparative Example 16; (k) Comparative Example 17.

UNSATURATED RUBBER-CONTAINING COMPOSITIONS. The compositions of Comparative Examples 8-17 all included unhydrogenated poly(conjugated diene) rubber in the form of the polybutadiene content of rubber-modified polystyrene and/or polystyrene-polybutadiene-polystyrene triblock copolymer. The samples containing polystyrene-polybutadiene-polystyrene triblock copolymer all exhibited beard growth rates of at least 34 milligrams per hour and as high as 104 milligrams per hour. Compared to the unsaturated rubber-containing control composition (Comparative Example 8 with 1.5 parts by weight LDPE), compositions with additives such as zinc stearate (Comparative Example 11, also containing 1 part by weight LDPE), low density polyethylene (Comparative Example 16), and polyethylene wax (Comparative Example 17) produced significantly lower beard-growth. The surface aesthetics were also good except that Comparative Example 17 with polyethylene wax showed slightly more grooves on the surface. Comparative Example 13 with ethylene-butene copolymer exhibited beard growth similar to that of zinc stearate-containing Comparative Example 11, but significant surface defects were observed on both the inner and outer surfaces of the pipes. Before conducting these experiments, the present inventors had expected that the use of fluoropolymers such as the vinylidene fluoride-hexafluoropropylene copolymer of Comparative Examples 14 and 15, and the polytetrafluoroethylene of Comparative Example 12 would help reduce the beard-growth by migrating to the pipe surfaces. To the contrary, the vinylidene fluoride-hexafluoropropylene copolymer of Comparative Examples 14 and 15 produced beard growth comparable to that of the control, Comparative Example 8. The use of the vinylidene fluoride-hexafluoropropylene copolymer was associated with a non-stick beard unlike any other additive, and this non-stick beard was frequently released from the die onto the surface of the pipes during the pipe extrusion. The use of the vinylidene fluoride-hexafluoropropylene copolymer was also associated with fluctuations in pipe weight and die pressures, presumably due to the slip stick effect. Although pipes extruded from the vinylidene fluoride-hexafluoropropylene copolymer-containing composition had smooth outer surfaces at the beginning of extrusion, these surfaces turned rough as extrusion progressed due to the grooves formed by deep die lines (that is, due to protrusion of the beard into the die void). The polytetrafluoroethylene-containing composition (Comparative Example 12) was found to be the worst additive in the SBS-containing matrix, showing severe beard-growth resulting in deformation of pipes, including deep outer surface die lines. Higher levels of fluoropolymers were not tested because they would have exceeded the halogen limit dictated by the VDE DIN 472 halogen free requirement. Comparative Examples 9 and 10, which included unhydrogenated poly(conjugated diene) rubber in the form of rubber-modified polystyrene but excluded polystyrene-polybutadiene-polystyrene triblock copolymer, exhibited low beard growth rates but lower heat resistance (lower Vicat B values) and impact strength (lower notched Izod impact strengths at 23 and −30° C., and lower notched Charpy impact strengths) and stiffness (lower flexural modulus values) compared to compositions free of unhydrogenated poly(conjugated diene) rubber.

UNSATURATED RUBBER-FREE COMPOSITIONS. The compositions containing SEBS and excluding SBS (Examples 5-7) all exhibited very low beard growth rates, even without processing additives. The best results were seen with the no-additive composition (Example 6) and the ethylene-butene copolymer-containing composition (Example 5). These samples exhibited almost no beard growth over 8 hours of pipe extrusion. The surface aesthetics of the pipes were also very good and similar to each other. The vinylidene fluoride-hexafluoropropylene copolymer-containing composition (Example 7) showed much less beard growth than its SBS-containing matrix counterparts (Comparative Examples 14 and 15). However, some problems were observed with release of beard from the dye, and die lines on the surface of the pipe were observed, possibly due to accumulation of the released beard in the calibrator holes. Significant variation in the die pressure and resultant pipe weight were also observed.

TABLE 3

| Process Parameter | Value |
| --- | --- |
| Zone 1 temp. (° C.) | 180 |
| Zone 2 temp. (° C.) | 215 |
| Zone 3 temp. (° C.) | 220 |
| Zone 4 temp. (° C.) | 225 |
| Zone 5 temp. (° C.) | 225 |
| Adapter temp. (° C.) | 225 |
| Die temp. (° C.) | 225 |
| Melt temp. (° C.) | ~233 |
| Screw Speed (rpm) | 18 |
| Line speed (m/min) | 4 |
| Desired Weight (g/m) | 90 |
| Pipe thickness (mm) | 1.3 |
| Distance die/calibrator (cm) | 1 |
| Cooling bath temp (° C.) | 30 |
| Cooling bath vacuum (bar) | 0.45 |

TABLE 4

| | C. Ex. 8 | C. Ex. 9 | C. Ex. 10 | C. Ex. 11 | C. Ex. 12 | C. Ex. 13 |
| --- | --- | --- | --- | --- | --- | --- |
| | COMPOSITION | | | | | |
| PPE 0.40 IV | 28.7 | 0 | 0 | 0 | 0 | 0 |
| PPE 0.56 IV | 28.0 | 0 | 0 | 0 | 0 | 0 |
| PPE 0.46 IV | 0 | 46.0 | 49.0 | 59.0 | 60.3 | 59.0 |
| HIPS | 14.6 | 31.8 | 33.8 | 22.3 | 22.9 | 22.3 |
| PS | 0 | 0 | 0 | 0 | 0 | 0 |

TABLE 4-continued

|  |  |  |  |  |  |  |
|---|---|---|---|---|---|---|
| HMWPS | 0 | 5.0 | 0 | 0 | 0 | 0 |
| SBS | 10 | 0 | 0 | 6.0 | 6.0 | 6.0 |
| SEBS | 0 | 3.0 | 3.0 | 0 | 0 | 0 |
| SEBS/PPE | 0 | 0 | 0 | 0 | 0 | 0 |
| RDP | 16 | 12.0 | 0 | 0 | 0 | 0 |
| BPADP | 0 | 0 | 12.0 | 10.0 | 10.0 | 10.0 |
| Phosphite A | 0 | 0 | 0.5 | 0.5 | 0.5 | 0.5 |
| Phosphite B | 0.5 | 0.5 | 0 | 0 | 0 | 0 |
| ZnO | 0.1 | 0.1 | 0.1 | 0.1 | 0.1 | 0.1 |
| ZnS | 0.1 | 0.1 | 0.1 | 0.1 | 0.1 | 0.1 |
| LDPE | 1.5 | 1.0 | 1.0 | 1.5 | 0 | 0 |
| PEPG | 0.5 | 0.5 | 0.5 | 0 | 0 | 0 |
| PE wax | 0 | 0 | 0 | 0 | 0 | 0 |
| Zn stearate | 0 | 0 | 0 | 0.5 | 0 | 0 |
| PTFE | 0 | 0.05 | 0.05 | 0 | 0.12 | 0 |
| EB | 0 | 0 | 0 | 0 | 0 | 2.0 |
| FP/LDPE | 0 | 0 | 0 | 0 | 0 | 0 |
| $TiO_2$ | 6.0 | 6.0 | 6.0 | 6.0 | 6.0 | 6.0 |
| Red 101 | 0.11 | 0.11 | 0.11 | 0.11 | 0.11 | 0.11 |
| Green 17 | 0.09 | 0.09 | 0.09 | 0.09 | 0.09 | 0.09 |
| Blue 29 | 0.11 | 0.11 | 0.11 | 0.11 | 0.11 | 0.11 |
| PROPERTIES |  |  |  |  |  |  |
| MVR, 280° C., 5 kg ($cc^3$/10 min) | 7 | 23 | 25 | 10 | 9 | 9 |
| UL 94, 1.5 mm | V-1 | V-1 | V-1 | V-1 | V-1 | V-1 |
| HDT A, 1.8 MPa (° C.) | 80 | 92 | 101 | 108 | 112 | 113 |
| Vicat B, B120 (° C.) | 115 | 112 | 125 | 134 | 138 | 138 |
| Flex. Mod., 23° C. (MPa) | 1700 | 2295 | 2591 | 2539 | 2663 | 2553 |
| Flex. Strength, 23° C. (MPa) | 90 | 78 | 90 | 97 | 105 | 97 |
| Notched Izod, 23° C. ($kJ/m^2$) | 25 | 17 | 13 | 20 | 15 | 20 |
| Notched Izod, −30° C. ($kJ/m^2$) | 20 | 8 | 6 | 10 | 8 | 11 |
| Charpy Notched 23 C ($kJ/m^2$) | 30 | 18 | 15 | 22 | 18 | 22 |
| Tensile Mod., 23° C. (MPa) | 2000 | 2349 | 2455 | 2408 | 2541 | 2439 |
| Tensile Strength @ yield, 23° C. (MPa) | 50 | 53 | 58 | 63 | 68 | 64 |
| Tensile Strain @ Break (%) | 10 | 25 | 16 | 17 | 14 | 14 |
| Beard growth rate measured over 8 hours (mg/h) | 104 | 3 | 5 | 34 | 40 | 34 |

|  | C. Ex. 14 | C. Ex. 15 | C. Ex. 16 | C. Ex. 17 | Ex. 5 | Ex. 6 | Ex. 7 |
|---|---|---|---|---|---|---|---|
| COMPOSITION |  |  |  |  |  |  |  |
| PPE 0.40 IV | 0 | 0 | 0 | 0 | 0 | 0 | 0 |
| PPE 0.56 IV | 0 | 0 | 0 | 0 | 0 | 0 | 0 |
| PPE 0.46 IV | 59.4 | 58.6 | 59.4 | 59.4 | 58.6 | 59.6 | 58.6 |
| HIPS | 22.4 | 22.2 | 22.4 | 22.4 | 0 | 0 | 0 |
| PS | 0 | 0 | 0 | 0 | 18.3 | 19.3 | 18.3 |
| HMWPS | 0 | 0 | 0 | 0 | 0 | 0 | 0 |
| SBS | 6.0 | 6.0 | 6.0 | 6.0 | 0 | 0 | 0 |
| SEBS | 0 | 0 | 0 | 0 | 0 | 0 | 0 |
| SEBS/PPE | 0 | 0 | 0 | 0 | 10.4 | 10.4 | 10.4 |
| RDP | 0 | 0 | 0 | 0 | 0 | 0 | 0 |
| BPADP | 10.0 | 10.0 | 10.0 | 10.0 | 10.0 | 10.0 | 10.0 |
| Phosphite A | 0.5 | 0.5 | 0.5 | 0.5 | 0.5 | 0.5 | 0.5 |
| Phosphite B | 0 | 0 | 0 | 0 | 0 | 0 | 0 |
| ZnO | 0.1 | 0.1 | 0.1 | 0.1 | 0.1 | 0.1 | 0.1 |
| ZnS | 0.1 | 0.1 | 0.1 | 0.1 | 0.1 | 0.1 | 0.1 |
| LDPE | 0 | 0 | 1.5 | 0 | 0 | 0 | 0 |
| PEPG | 0 | 0 | 0 | 0 | 0 | 0 | 0 |
| PE wax | 0 | 0 | 0 | 1.5 | 0 | 0 | 0 |
| Zn stearate | 0 | 0 | 0 | 0 | 0 | 0 | 0 |
| PTFE | 0 | 0 | 0 | 0 | 0 | 0 | 0 |
| EB | 0 | 0 | 0 | 0 | 2.0 | 0 | 0 |
| FP/LDPE | 1.5 | 2.5 | 0 | 0 | 0 | 0 | 2.0 |
| $TiO_2$ | 6.0 | 6.0 | 6.0 | 6.0 | 0 | 0 | 0 |
| Red 101 | 0.11 | 0.11 | 0.11 | 0.11 | 0.11 | 0 | 0 |
| Green 17 | 0.09 | 0.09 | 0.09 | 0.09 | 0.09 | 0 | 0 |
| Blue 29 | 0.11 | 0.11 | 0.11 | 0.11 | 0.11 | 0 | 0 |
| PROPERTIES |  |  |  |  |  |  |  |
| MVR, 280° C., 5 kg ($cc^3$/10 min) | 9 | 9 | 8 | 9 | 12 | 9 | 9 |
| UL 94, 1.5 mm | V-1 | V-1 | V-1 | V-1 | V-1 | V-1 | V-1 |
| HDT A, 1.8 MPa (° C.) | 113 | 111 | 113 | 112 | 115 | 114 | 114 |
| Vicat B, B120 (° C.) | 138 | 137 | 138 | 137 | 140 | 140 | 140 |
| Flex. Mod., 23° C. (MPa) | 2507 | 2402 | 2454 | 2388 | 2552 | 2498 | 2447 |
| Flex. Strength, 23° C. (MPa) | 97 | 97 | 99 | 95 | 99 | 99 | 97 |
| Notched Izod, 23° C. ($kJ/m^2$) | 19 | 20 | 20 | 20 | 23 | 24 | 24 |
| Notched Izod, −30° C. ($kJ/m^2$) | 11 | 12 | 10 | 10 | 9 | 11 | 11 |
| Charpy Notched 23 C ($kJ/m^2$) | 21 | 23 | 22 | 21 | 26 | 26 | 26 |

TABLE 4-continued

|  | | | | | | | |
|---|---|---|---|---|---|---|---|
| Tensile Mod., 23° C. (MPa) | 2468 | 2400 | 2441 | 2455 | 2533 | 2563 | 2530 |
| Tensile Strength @ yield, 23° C. (MPa) | 65 | 64 | 65 | 64 | 68 | 64 | 65 |
| Tensile Strain @ Break (%) | 17 | 14 | 15 | 14 | 10 | 14 | 14 |
| Beard growth rate measured over 8 hours (mg/h) | 84 | 84 | 34 | 36 | 1 | 3 | 2 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of reducing die lip build-up during profile extrusion of a thermoplastic article, comprising:
   profile extruding through a die a thermoplastic composition having a temperature of 220 to 240° C.; and
   cooling the extruded composition to form an extruded thermoplastic article;
   wherein the thermoplastic composition comprises
      56 to 62 weight percent of a poly(arylene ether),
      16 to 22 weight percent of a homopolystyrene,
      7 to 13 weight percent of a hydrogenated block copolymer of an alkenyl aromatic compound and a conjugated diene, and
      7 to 13 weight percent of a triaryl phosphate;
   wherein the thermoplastic composition comprises less than 1 weight percent of unhydrogenated poly(conjugated diene) rubber;
   wherein all weight percents are based on the total weight of the thermoplastic composition;
   wherein the thermoplastic composition exhibits
      an Izod notched impact strength at −30° C. of at least 6 kilojoules/meter$^2$, as measured according to ISO 180 using notch configuration A, and
      a Vicat B value of at least 125° C., measured according to ISO 306, Method B120;
   wherein the profile extruding the thermoplastic composition produces an average die lip build-up per hour measured over the course of 8 continuous hours of profile extrusion of the thermoplastic composition, measured at a melt temperature of 233° C. using an annular die having an outside diameter of 24.6 millimeters and an inside diameter of 21.35 millimeters; and wherein the average die lip build-up is less than that produced by a corresponding thermoplastic composition in which the hydrogenated block copolymer is replaced by an equal weight of an unhydrogenated block copolymer.

2. The method of claim 1, wherein the average die lip build-up per hour measured over the course of 8 continuous hours of profile extrusion of the thermoplastic composition is less than or equal to 5 milligrams per hour.

3. The method of claim 1, wherein the average die lip build-up per hour measured over the course of 8 continuous hours of profile extrusion of the thermoplastic composition is 1 to 5 milligrams per hour.

4. The method of claim 1, wherein the hydrogenated block copolymer of an alkenyl aromatic compound and a conjugated diene is a polystyrene-poly(ethylene-butylene)-polystyrene triblock copolymer.

5. The method of claim 1, wherein the thermoplastic composition further comprises 0.5 to 5 weight percent of an ethylene-butene copolymer having a viscosity average molecular weight of 3,500 to 6,000 atomic mass units, and a density of 0.88 to 0.92 gram/milliliter.

6. The method of claim 1, wherein the thermoplastic composition further comprises 0.025 to 0.5 weight percent of a copolymer of vinylidene fluoride and hexafluoropropylene having a fluorine content of 60 to 70 weight percent based on the total weight of the copolymer.

7. The method of claim 1, wherein the thermoplastic composition further comprises 3 to 9 weight percent titanium dioxide.

8. The method of claim 1, wherein the thermoplastic composition exhibits at least one of
   a flexural strength of at least 95 megapascals, measured at 23° C. according to ISO 178,
   a notched Izod impact strength of at least 20 kilojoules/meter$^2$, measured at 23° C. according to ISO 180 using notch configuration A,
   a Charpy notched impact strength of at least 20 kilojoules/meter$^2$, measured at 23° C. according to ISO 179 using notch type A, and
   a tensile strength at yield of at least 60 megapascals, measured at 23° C. according to ISO 527.

9. The method of claim 1,
   wherein the thermoplastic composition comprises
      57 to 61 weight percent of the poly(arylene ether),
      17 to 21 weight percent of the homopolystyrene,
      8 to 12 weight percent of the hydrogenated block copolymer, wherein the hydrogenated block copolymer comprises a polystyrene-poly(ethylene-butylene)-polystyrene triblock copolymer,
      8 to 12 weight percent of the triaryl phosphate;
   wherein the thermoplastic composition further comprises
      3 to 9 weight percent titanium dioxide, and 1 to 3 weight percent of an ethylene-butene copolymer having a viscosity average molecular weight of 3,500 to 6,000 atomic mass units, a density of 0.88 to 0.92 gram/milliliter, and a viscosity of 1,000 to 1,500 millipascal-seconds at 140° C.;

wherein the thermoplastic composition comprises less than 0.5 weight percent of unhydrogenated poly(conjugated diene) rubber;

wherein the thermoplastic composition exhibits
an Izod notched impact strength at −30° C. of 6 to 12 kilojoules/meter$^2$, and
a Vicat B value of 125 to 145° C., measured according to ISO 306, Method B120;

wherein the average die lip build-up per hour measured over the course of 8 continuous hours of profile extrusion of the thermoplastic composition is 1 to 5 milligrams per hour; and wherein the thermoplastic composition exhibits at least one of
a flexural strength of 95 to 100 megapascals, measured at 23° C. according to ISO 178,
a notched Izod impact strength of 20 to 25 kilojoules/meter$^2$, measured at 23° C. according to ISO 180 using notch configuration A,
a Charpy notched impact strength of 20 to 30 kilojoules/meter$^2$, measured at 23° C. according to ISO 179 using notch type A, and
a tensile strength at yield of 60 to 70 megapascals, measured at 23° C. according to ISO 527.

10. The method of claim 1, wherein the thermoplastic composition consists of
the poly(arylene ether),
the homopolystyrene,
the hydrogenated block copolymer,
the triaryl phosphate,
optionally, 0.5 to 5 weight percent of an ethylene-butene copolymer having a viscosity average molecular weight of 3,500 to 6,000 atomic mass units, and a density of 0.88 to 0.92 gram/milliliter,
optionally, 0.025 to 0.5 weight percent of a copolymer of vinylidene fluoride and hexafluoropropylene having a fluorine content of 60 to 70 weight percent based on the total weight of the copolymer,
optionally, 3 to 9 weight percent titanium dioxide,
optionally, 0.5 to 10 weight percent of a metal hydroxide, and
optionally, one or more additives known in the thermoplastic arts, including, for example, stabilizers, antioxidants, mold release agents, drip retardants, nucleating agents, UV blockers, dyes, pigments, fragrances, anti-static agents, mineral oil, metal deactivators, antiblocking agents, fillers having a particle size less than or equal to 5 micrometers, and combinations thereof.

11. The method of claim 4, wherein the polystyrene-poly(ethylene-butylene)-polystyrene triblock copolymer is provided in the form of a masterbatch comprising 50 to 95 weight percent of the polystyrene-poly(ethylene-butylene)-polystyrene triblock copolymer and 5 to 50 weight percent poly(arylene ether), based on the total weight of the masterbatch.

12. The method of claim 6, wherein the copolymer of vinylidene fluoride and hexafluoropropylene is provided in the form of a masterbatch comprising 2 to 10 weight percent of the copolymer of vinylidene fluoride and hexafluoropropylene and 90 to 98 weight percent low density polyethylene, based on the total weight of the masterbatch.

13. A profile extruded article, produced by a process comprising:
profile extruding through a die a thermoplastic composition having a temperature of 220 to 240° C.; and
cooling the extruded composition to form an extruded thermoplastic article;

wherein the thermoplastic composition comprises
56 to 62 weight percent of a poly(arylene ether),
16 to 22 weight percent of a homopolystyrene,
7 to 13 weight percent of a hydrogenated block copolymer of an alkenyl aromatic compound and a conjugated diene, and
7 to 13 weight percent of a triaryl phosphate;

wherein the thermoplastic composition comprises less than 1 weight percent of unhydrogenated poly(conjugated diene) rubber;

wherein all weight percents are based on the total weight of the thermoplastic composition;

wherein the thermoplastic composition exhibits
an Izod notched impact strength at −30° C. of at least 6 kilojoules/meter$^2$, as measured according to ISO 180 using notch configuration A, and
a Vicat B value of at least 125° C., measured according to ISO 306, Method B120;

wherein profile extrusion of the thermoplastic composition over the course of 8 continuous hours produces an average die lip build-up per hour less than or equal to 5 milligrams per hour, measured at a melt temperature of 233° C. using an annular die having an outside diameter of 24.6 millimeters and an inside diameter of 21.35 millimeters; and wherein the profile extruded article is substantially free of visible residue of die lip build-up.

14. The profile-extruded article of claim 13,
wherein the thermoplastic composition comprises
57 to 61 weight percent of the poly(arylene ether),
17 to 21 weight percent of the homopolystyrene,
8 to 12 weight percent of the hydrogenated block copolymer, wherein the hydrogenated block copolymer comprises a polystyrene-poly(ethylene-butylene)-polystyrene triblock copolymer,
8 to 12 weight percent of the triaryl phosphate;

wherein the thermoplastic composition further comprises
3 to 9 weight percent titanium dioxide, and
1 to 3 weight percent of an ethylene-butene copolymer having a viscosity average molecular weight of 3,500 to 6,000 atomic mass units, a density of 0.88 to 0.92 gram/milliliter, and a viscosity of 1,000 to 1,500 millipascal-seconds at 140° C.;

wherein the thermoplastic composition comprises less than 0.5 weight percent of unhydrogenated poly(conjugated diene) rubber;

wherein the thermoplastic composition exhibits
an Izod notched impact strength at −30° C. of 6 to 12 kilojoules/meter$^2$, and
a Vicat B value of 125 to 145° C., measured according to ISO 306, Method B120;

wherein the die lip build-up produced by the thermoplastic composition is 1 to 5 milligrams per hour; and wherein the thermoplastic composition exhibits at least one of
a flexural strength of 95 to 100 megapascals, measured at 23° C. according to ISO 178,
a notched Izod impact strength of 20 to 25 kilojoules/meter$^2$, measured at 23° C. according to ISO 180 using notch configuration A,
a Charpy notched impact strength of 20 to 30 kilojoules/meter$^2$, measured at 23° C. according to ISO 179 using notch type A, and a tensile strength at yield of 60 to 70 megapascals, measured at 23° C. according to ISO 527.

15. The profile extruded article of claim 13, wherein the thermoplastic composition consists of
- the poly(arylene ether),
- the homopolystyrene,
- the hydrogenated block copolymer,
- the triaryl phosphate,
- optionally, 0.5 to 5 weight percent of an ethylene-butene copolymer having a viscosity average molecular weight of 3,500 to 6,000 atomic mass units, and a density of 0.88 to 0.92 gram/milliliter,
- optionally, 0.025 to 0.5 weight percent of a copolymer of vinylidene fluoride and hexafluoropropylene having a fluorine content of 60 to 70 weight percent based on the total weight of the copolymer,
- optionally, 3 to 9 weight percent titanium dioxide,
- optionally, 0.5 to 10 weight percent of a metal hydroxide, and
- optionally, one or more additives known in the thermoplastic arts, including, for example, stabilizers, antioxidants, mold release agents, drip retardants, nucleating agents, UV blockers, dyes, pigments, fragrances, anti-static agents, mineral oil, metal deactivators, antiblocking agents, fillers having a particle size less than or equal to 5 micrometers, and combinations thereof.

* * * * *